(12) United States Patent
Liang et al.

(10) Patent No.: US 7,746,592 B1
(45) Date of Patent: Jun. 29, 2010

(54) DISK DRIVE DETECTING DEFECTIVE SPIRAL SERVO TRACK

(75) Inventors: Jiangang Liang, San Jose, CA (US); Siri S. Weerasooriya, Campbell, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 12/371,434

(22) Filed: Feb. 13, 2009

(51) Int. Cl.
*G11B 21/02* (2006.01)
*G11B 5/09* (2006.01)
*G11B 5/596* (2006.01)

(52) U.S. Cl. .......................... 360/75; 360/31; 360/77.07

(58) Field of Classification Search .................. None
See application file for complete search history.

(56) References Cited

U.S. PATENT DOCUMENTS

| | | | |
|---|---|---|---|
| 5,668,679 A | 9/1997 | Swearingen et al. |
| 5,754,352 A | 5/1998 | Behrens et al. |
| 6,005,727 A | 12/1999 | Behrens et al. |
| 6,021,012 A | 2/2000 | Bang |
| 6,091,564 A | 7/2000 | Codilian et al. |
| 6,191,906 B1 | 2/2001 | Buch |
| 6,292,318 B1 | 9/2001 | Hayashi |
| 6,304,407 B1 | 10/2001 | Baker et al. |
| 6,411,453 B1 | 6/2002 | Chainer et al. |
| 6,507,450 B1 | 1/2003 | Elliott |
| 6,519,107 B1 | 2/2003 | Ehrlich et al. |
| 6,587,293 B1 | 7/2003 | Ding et al. |
| 6,704,156 B1 | 3/2004 | Baker et al. |
| 6,738,205 B1 | 5/2004 | Moran et al. |
| 6,920,004 B1 | 7/2005 | Codilian et al. |
| 6,924,960 B1 | 8/2005 | Melkote et al. |
| 6,937,420 B1 | 8/2005 | McNab et al. |
| 6,943,978 B1 | 9/2005 | Lee |
| 6,967,799 B1 | 11/2005 | Lee |
| 6,985,316 B1 | 1/2006 | Liikanen et al. |
| 6,987,636 B1 | 1/2006 | Chue et al. |
| 6,989,954 B1 | 1/2006 | Lee et al. |
| 7,002,761 B1 | 2/2006 | Sutardja et al. |
| 7,019,937 B1 | 3/2006 | Liikanen et al. |
| 7,088,533 B1 | 8/2006 | Shepherd et al. |
| 7,136,253 B1 | 11/2006 | Liikanen et al. |
| 7,145,744 B1 | 12/2006 | Clawson et al. |
| 7,212,364 B1 | 5/2007 | Lee |
| 7,230,786 B1 | 6/2007 | Ray et al. |
| 7,411,758 B1 | 8/2008 | Cheung et al. |
| 7,656,604 B1 | 2/2010 | Liang et al. |
| 2006/0171059 A1 | 8/2006 | Chan et al. |
| 2007/0070538 A1 | 3/2007 | Lau et al. |
| 2007/0076314 A1 | 4/2007 | Rigney |
| 2007/0211367 A1 | 9/2007 | Lau et al. |
| 2009/0168225 A1* | 7/2009 | Matsunaga et al. ....... 360/77.02 |

* cited by examiner

*Primary Examiner*—Andrew L Sniezek (57) ABSTRACT

A disk drive is disclosed comprising a disk and a head actuated over the disk, wherein the disk comprises a plurality of spiral tracks, each comprising a high frequency signal interrupted by a sync mark at a sync mark interval. The head is used to read a spiral track to generate a spiral track crossing signal $g(x_n)$, where $x_n$ is a time in a demodulation window. A position error signal (PES) is determined in response to $g(x_n)$, and a deviation index is computed by correlating $g(x_n)$ with a nominal track crossing signal shifted by the PES. When the deviation index is less than a threshold, the PES is used to servo the head over the disk.

16 Claims, 14 Drawing Sheets

DISK DRIVE DETECTING DEFECTIVE SPIRAL SERVO TRACK

BACKGROUND

Description of the Related Art

Figure 1:
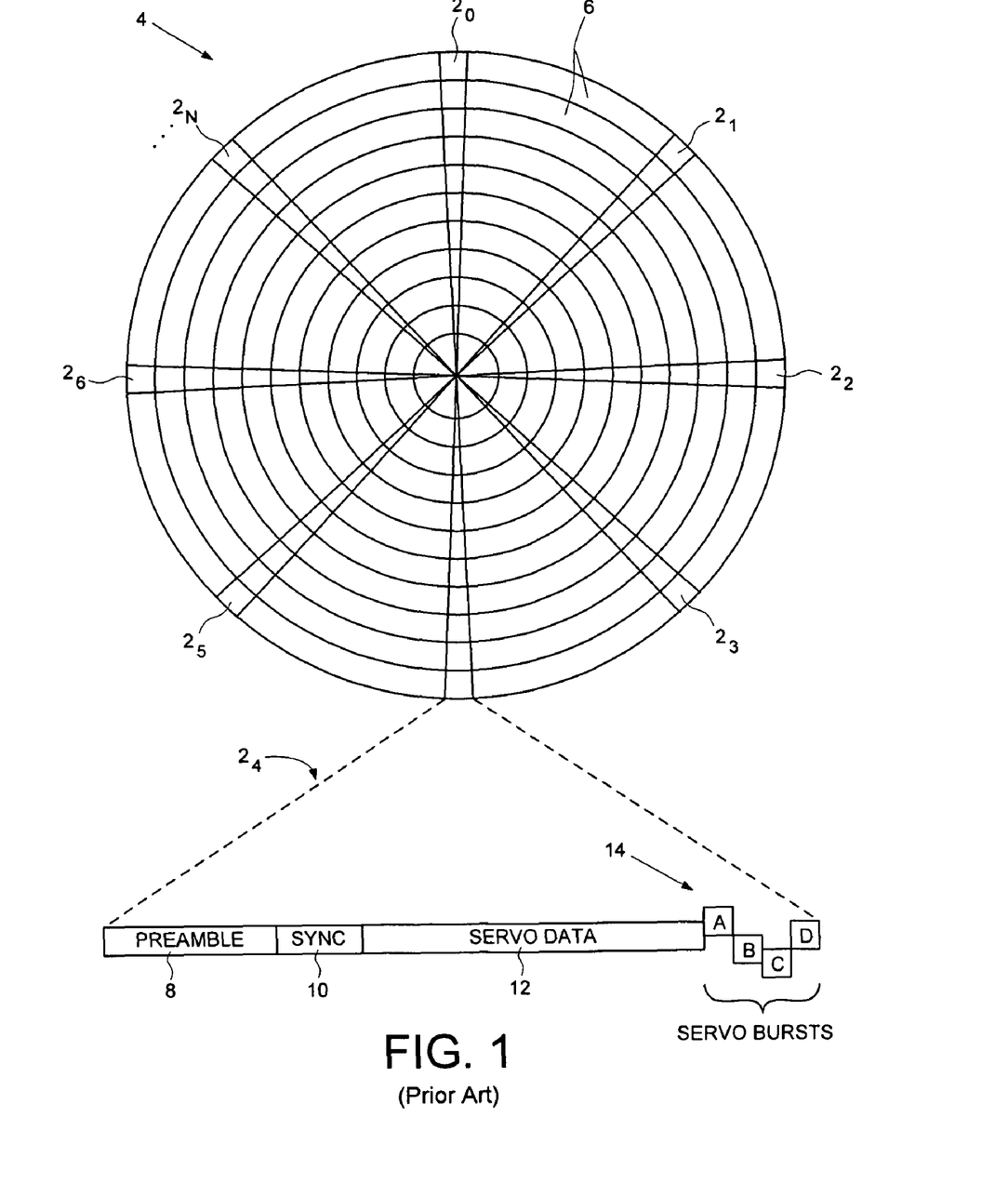
FIG. 1 shows a prior art disk format comprising a plurality of concentric data tracks defined by embedded servo sectors.

When manufacturing a disk drive, servo sectors $2_0$-$2_N$ are written to a disk 4 which define a plurality of radially-spaced, concentric data tracks 6 as shown in the prior art disk format of FIG. 1. Each data track 6 is partitioned into a plurality of data sectors wherein the servo sectors $2_0$-$2_N$ are considered "embedded" in the data sectors. Each servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. The coarse head position information is processed to position a head over a target track during a seek operation, and the servo bursts 14 are processed to maintain the head over a centerline of the target track while writing or reading data during a tracking operation.

In the past, external servo writers have been used to write the product servo sectors $2_0$-$2_N$ to the disk surface during manufacturing. External servo writers employ extremely accurate head positioning mechanics, such as a laser interferometer, to ensure the product servo sectors $2_0$-$2_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the product servo sectors independent of an external servo writer. For example, U.S. Pat. No. 5,668,679 teaches a disk drive which performs a self-servo writing operation by writing a plurality of spiral tracks to the disk which are then processed to write the product servo sectors along a circular path. Each spiral track is written to the disk as a high frequency signal (with missing bits), wherein the position error signal (PES) for tracking is generated relative to time shifts in the detected location of the spiral tracks. The read signal is rectified and low pass filtered to generate a triangular envelope signal representing a spiral track crossing, wherein the location of the spiral track is detected by detecting a peak in the triangular envelope signal relative to a clock synchronized to the rotation of the disk.

DETAILED DESCRIPTION OF EMBODIMENTS OF THE INVENTION

Figure 2A:
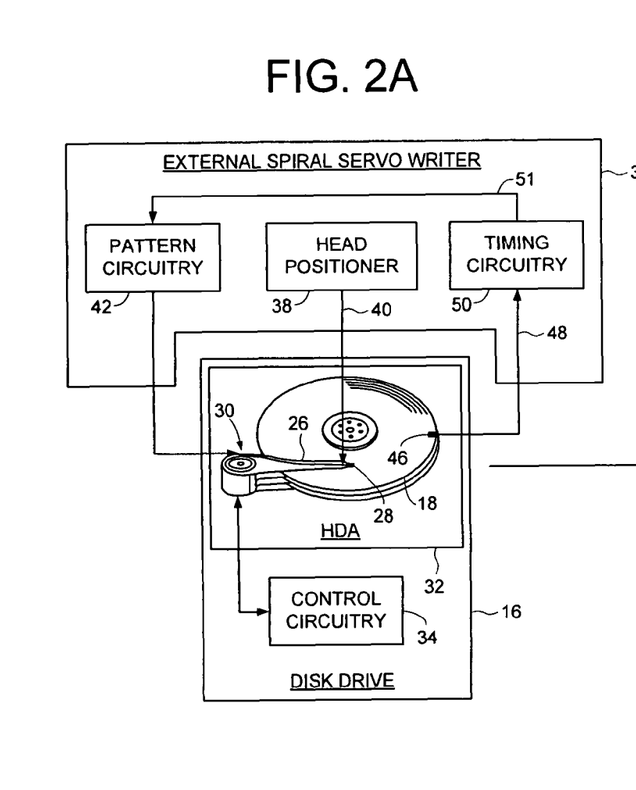
FIG. 2A shows an external spiral servo writer for writing spiral tracks to the disk according to an embodiment of the present invention.
Figure 2B:
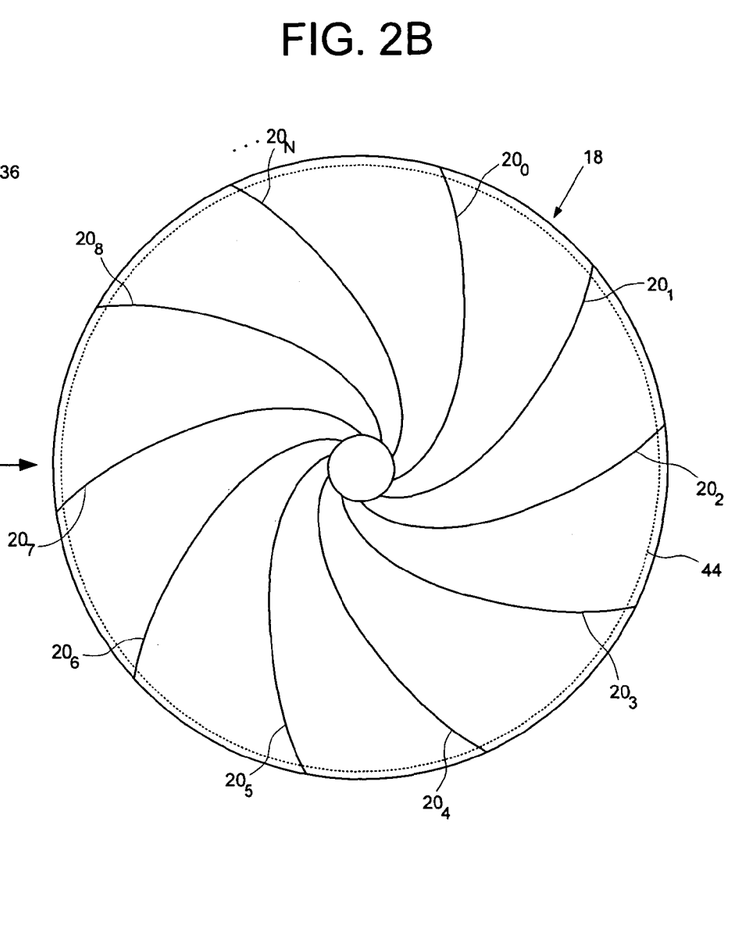
FIG. 2B shows spiral tracks written to the disk over a partial disk revolution according to an embodiment of the present invention.
Figure 6:
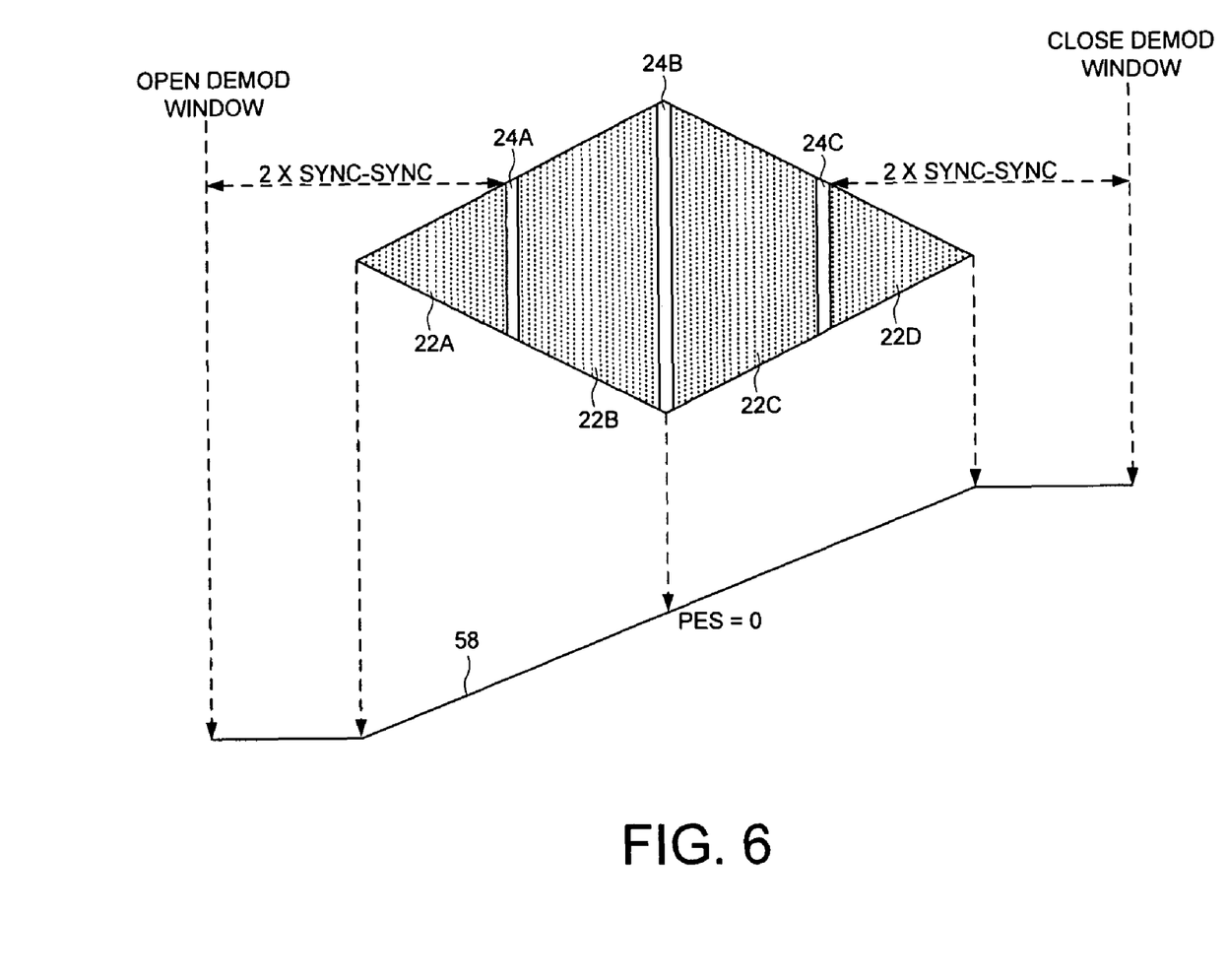
FIG. 6 illustrates an embodiment of the present invention wherein the high frequency signal in the spiral tracks is demodulated by integrating the read signal over a demodulation window and generating the PES relative to a target sync mark and a reference point on the resulting ramp signal.
Figure 8A:
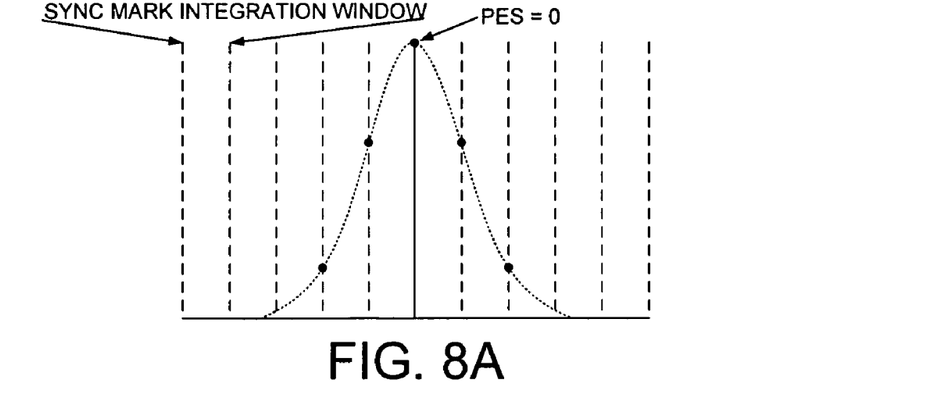
FIGS. 8A-8C illustrate an embodiment of the present invention for generating a function that estimates the nominal track crossing signal.

FIGS. 2A and 2B show a disk drive 16 according to an embodiment of the present invention comprising a disk 18 including a plurality of spiral tracks $20_0$-$20_N$, wherein each spiral track comprises a high frequency signal 22 interrupted by a sync mark 24 at a sync mark interval (FIG. 4B), and a head 28 actuated over the disk 18. FIG. 8A illustrates how a spiral tracks 20, is read to generate a spiral track crossing signal $g(x_n)$, where $x_n$ is a time in a demodulation window. A position error signal (PES) is determined in response to $g(x_n)$ is determined (e.g., by integrating the spiral track crossing signal as shown in FIG. 6), and a deviation index is computed by correlating $g(x_n)$ with a nominal track crossing signal shifted by the PES. When the deviation index is less than a threshold, the PES is used to servo the head 28 over the disk 18. In one embodiment, the deviation index is computed according to:

$$di = \sum_{n=1}^{N}(g(x_n) - f(x_n - x_0 + PES))^2$$

where di is the deviation index and $f(x_n-x_0+PES)$ represents the nominal track crossing signal shifted by the PES.

In the embodiment of FIG. 2A, the disk drive 16 comprises control circuitry 34 and a head disk assembly (HDA) 32 comprising the disk 18, an actuator arm 26, the head 28 coupled to a distal end of the actuator arm 26, and a voice coil motor 30 for rotating the actuator arm 26 about a pivot to position the head 28 radially over the disk 18. In one embodiment, a write clock is synchronized to the rotation of the disk 18, and the plurality of spiral tracks $20_0$-$20_N$ are written on the disk 18 at a predetermined circular location determined from the write clock.

The spiral tracks $20_0$-$20_N$ may be written to the disk 18 using any suitable technique. In the embodiment of FIG. 2A, an entire disk drive 16 is inserted into an external spiral servo writer 36. In an alternative embodiment, only the HDA 32 of the disk drive is inserted into the external spiral servo writer 36. In yet another embodiment, an external media writer is used to write the spiral tracks $20_0$-$20_N$ to a number of disks 18, and one or more of the disks 18 are then inserted into an HDA 32. In yet another embodiment, the spiral tracks $20_0$-$20_N$ are stamped onto the disk 18 using magnetic printing techniques. In still another embodiment, the control circuitry 34 within each disk drive 16 are used to self write the spiral tracks $20_0$-$20_N$, for example, while servoing on concentric servo sectors prewritten on one of the disk surfaces.

Referring again to the embodiment of FIG. 2A, the external spiral servo writer 36 comprises a head positioner 38 for actuating a head positioning pin 40 using sensitive positioning circuitry, such as a laser interferometer. While the head positioner 38 moves the head 28 at a predetermined velocity over the stroke of the actuator arm 26, pattern circuitry 42 generates the data sequence written to the disk 18 for a spiral track 20. The external spiral servo writer 36 inserts a clock head 46 into the HDA 32 for writing a clock track 44 (FIG. 2B) at an outer diameter of the disk 18. The clock head 46 then reads the clock track 44 to generate a clock signal 48 processed by timing recovery circuitry 50 to synchronize the write clock 51 for writing the spiral tracks $20_0$-$20_N$ to the disk 18. The timing recovery circuitry 50 enables the pattern circuitry 42 at the appropriate time relative to the write clock 51 so that the spiral tracks $20_0$-$20_N$ are written at the appropriate circular location. The timing recovery circuitry 50 also enables the pattern circuitry 42 relative to the write clock 51 to write the sync marks 24 (FIG. 4B) within the spiral tracks $20_0$-$20_N$ at the same circular location from the outer diameter to the inner diameter of the disk 18. As described below with reference to FIG. 5, the constant interval between sync marks 24 (independent of the radial location of the head 28) enables the servo write clock to maintain synchronization while writing the product servo sectors to the disk.

Figure 3:
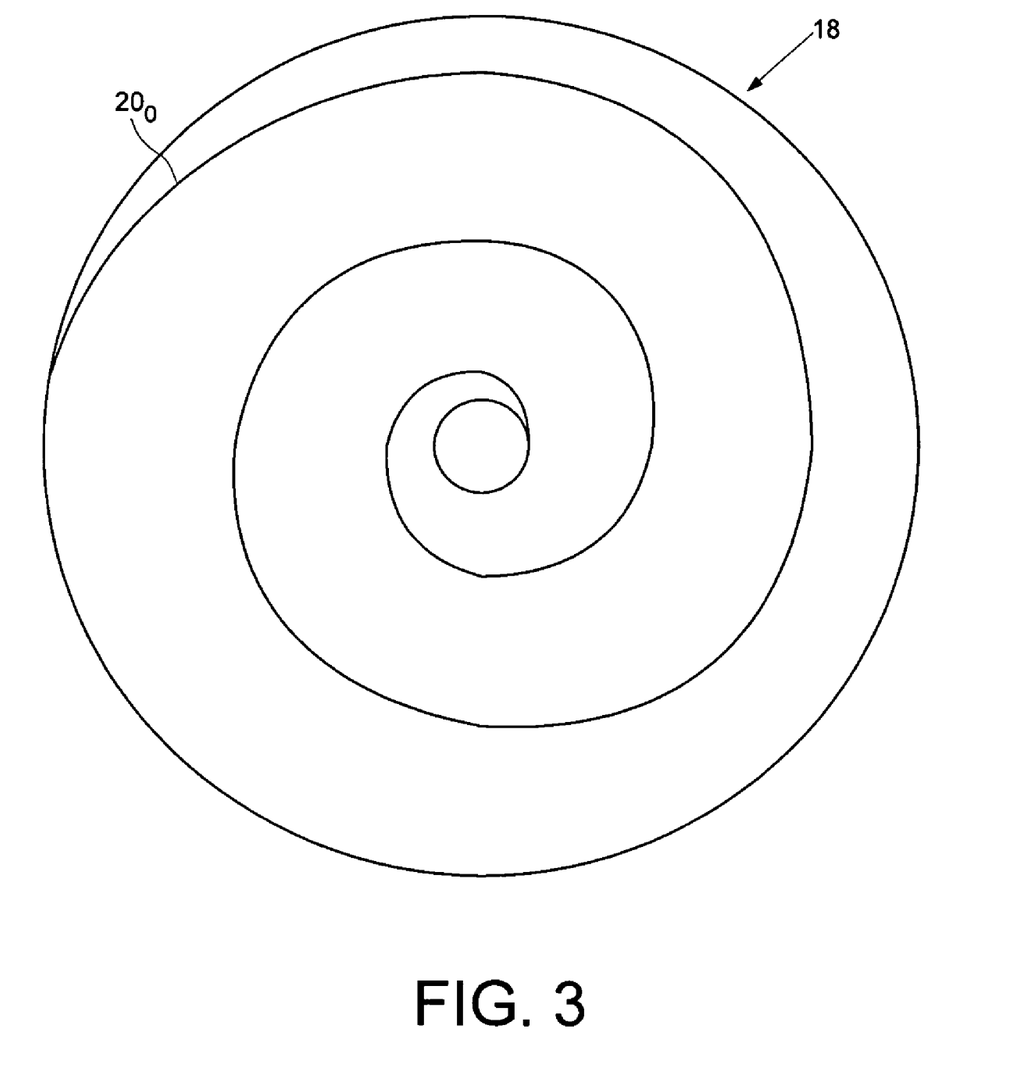
FIG. 3 illustrates an embodiment of the present invention wherein each spiral track is written over multiple revolutions of the disk.

In the embodiment of FIG. 2B, each spiral track 20, is written over a partial revolution of the disk 18. In an alternative embodiment, each spiral track 20, is written over one or more revolutions of the disk 18. FIG. 3 shows an embodiment wherein each spiral track 20, is written over multiple revolutions of the disk 18.

Referring again to the embodiment of FIG. 2A, after the external spiral servo writer 36 writes the spiral tracks $20_0$-$20_N$ to the disk 18, the head positioning pin 40 and clock head 46 are removed from the HDA 32 and the product servo sectors are written to the disk 18 during a "fill operation". In one embodiment, the control circuitry 34 within the disk drive 16 is used to process the spiral tracks $20_0$-$20_N$ in order to write the product servo sectors to the disk 18. In an alternative embodiment described below with reference to FIGS. 10 and 11, an external product servo writer is used to process the spiral tracks $20_0$-$20_N$ in order to write the product servo sectors to the disk 18.

Figure 4A:
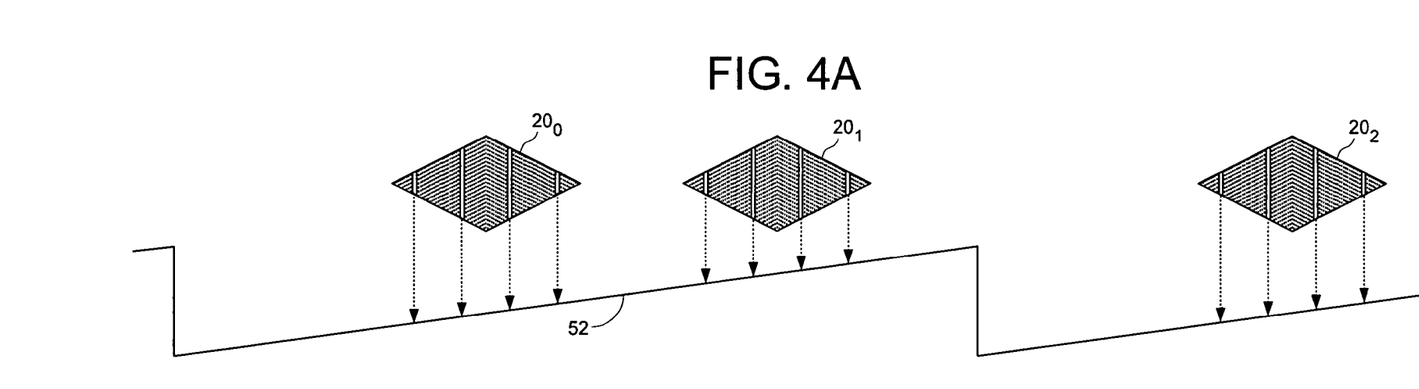
FIG. 4A shows an embodiment of the present invention wherein a servo write clock is synchronized by clocking a modulo-N counter relative to when the sync marks in the spiral tracks are detected.
Figure 4B:
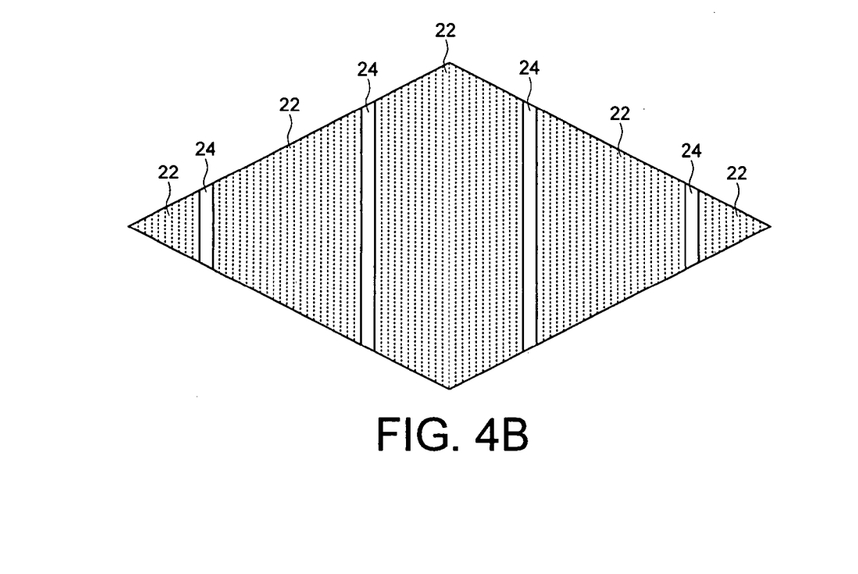
FIG. 4B shows an eye pattern generated by reading the spiral track, including the sync marks in the spiral track.

FIG. 4B illustrates an "eye" pattern in the read signal that is generated when the head 28 passes over a spiral track 20. The read signal representing the spiral track comprises high frequency transitions 22 interrupted by sync marks 24. When the head 28 moves in the radial direction, the eye pattern will shift (left or right) while the sync marks 24 remain fixed. The shift in the eye pattern (detected from the high frequency signal 22) relative to the sync marks 24 provides the off-track information (position error signal or PES) for servoing the head 28.

FIG. 4A shows an embodiment of the present invention wherein a saw-tooth waveform 52 is generated by clocking a modulo-N counter with the servo write clock, wherein the frequency of the servo write clock is adjusted until the sync marks 24 in the spiral tracks $20_0$-$20_N$ are detected at a target modulo-N count value. The servo write clock may be generated using any suitable circuitry, such as a phase locked loop (PLL). As each sync mark 24 in the spiral tracks $20_0$-$20_N$ is detected, the value of the modulo-N counter represents the phase error for adjusting the PLL. In one embodiment, the PLL is updated when any one of the sync marks 24 within the eye pattern is detected. In this manner the multiple sync marks 24 in each eye pattern (each spiral track crossing) provides redundancy so that the PLL is still updated if one or more of the sync marks 24 are missed due to noise in the read signal. Once the sync marks 24 are detected at the target modulo-N counter values, the servo write clock is coarsely locked to the desired frequency for writing the product servo sectors to the disk 18.

The sync marks 24 in the spiral tracks $20_0$-$20_N$ may comprise any suitable pattern, and in one embodiment, a pattern that is substantially shorter than the sync mark 10 in the conventional product servo sectors 2 of FIG. 1. A shorter sync mark 24 may allow the spiral tracks $20_0$-$20_N$ to be written to the disk 18 using a steeper slope (by moving the head faster from the outer diameter to the inner diameter of the disk 18), which may reduce the time required to write each spiral track $20_0$-$20_N$.

In one embodiment, the servo write clock is further synchronized by generating a timing recovery measurement from the high frequency signal 22 between the sync marks 24 in the spiral tracks $20_0$-$20_N$. Synchronizing the servo write clock to the high frequency signal 22 helps maintain proper radial alignment (phase coherency) of the Gray coded track addresses in the product servo sectors. The timing recovery measurement may be generated in any suitable manner. In one embodiment, the servo write clock is used to sample the high frequency signal 22 and the signal sample values are processed to generate the timing recovery measurement. The timing recovery measurement adjusts the phase of the servo write clock (PLL) so that the high frequency signal 22 is sampled synchronously. In this manner, the sync marks 24 provide a coarse timing recovery measurement and the high frequency signal 22 provides a fine timing recovery measurement for maintaining synchronization of the servo write clock.

Figure 5:
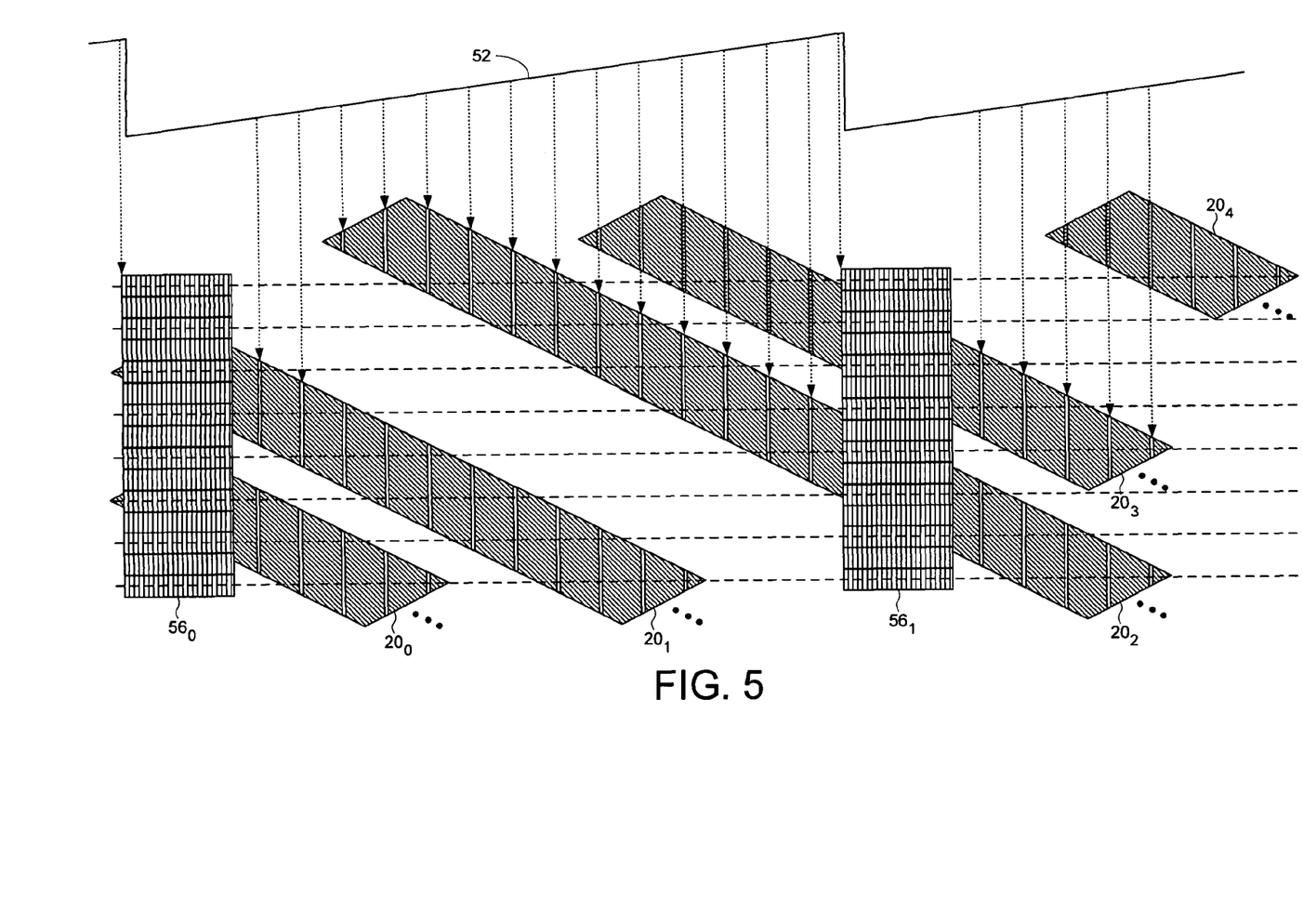
FIG. 5 illustrates writing of product servo sectors using a servo write clock generated from reading the spiral tracks.

FIG. 5 illustrates how the product servo sectors $56_0$-$56_N$ are written to the disk 18 after synchronizing the servo write clock in response to the high frequency signal 22 and the sync marks 24 in the spiral tracks $20_0$-$20_N$. In the embodiment of FIG. 5, the dashed lines represent the centerlines of the data tracks. The sync marks in the spiral tracks $20_0$-$20_N$ are written so that there is a shift of two sync marks 24 in the eye pattern (FIG. 4B) between data tracks. In an alternative embodiment, the sync marks 24 in the spiral tracks $20_0$-$20_N$ are written so that there is a shift of N sync marks in the eye pattern between data tracks. In the embodiment of FIG. 5, the data tracks are narrower than the spiral tracks 20, however, in an alternative embodiment the data tracks are wider than or proximate the width of the spiral tracks 20.

Once the head 28 is tracking on a servo track, the product servo sectors $56_0$-$56_N$ are written to the disk using the servo write clock. Write circuitry is enabled when the modulo-N counter reaches a predetermined value, wherein the servo write clock clocks the write circuitry to write the product servo sector 56 to the disk. In one embodiment, the spiral tracks $20_0$-$20_N$ on the disk are processed in an interleaved manner to account for the product servo sectors $56_0$-$56_N$ overwriting a spiral track. For example, when writing the product servo sectors $56_1$ to the disk, spiral track $20_2$ is processed initially to generate the PES tracking error and the timing recovery measurement. When the product servo sectors $56_1$ begin to overwrite spiral track $20_2$, spiral track $20_3$ is processed to generate the PES tracking error and the timing recovery measurement. In the embodiment of FIG. 5, the spiral tracks 20 are written as pairs to facilitate the interleave processing; however, the spiral tracks may be written using any suitable spacing (e.g., equal spacing) while still implementing the interleaving aspect.

In another embodiment, the spiral tracks $20_0$-$20_N$ are written at less than a 2 to 1 ratio relative to the product servo sectors $56_0$-$56_N$ and all of the spiral tracks are demodulated $20_0$-$20_N$ (no interleaving). In one embodiment, when a product servo sector overwrites a spiral track, the resulting distortion in the spiral track crossing signal is detected so that the resulting PES can be ignored.

FIG. 6 shows an embodiment of the present invention wherein the high frequency signal 22 in a spiral track 20 is demodulated by integrating the read signal to generate a ramp signal 58. The PES is generated relative to a target sync mark 24 in the spiral track 20 and a reference point of the ramp signal 58. In the embodiment of FIG. 6, there are three sync marks 24A-24C in each spiral track crossing (each eye pattern) and the PES is generated as the deviation of the middle sync mark 24B from the center of the ramp signal 58. This deviation can be computed as the difference in the amplitude of the ramp signal 58 when the middle sync mark 24B is detected, or the difference in time between when the middle sync mark 24B is detected and the middle of the ramp signal 58. Also in this embodiment, the demodulation window is opened a number of sync mark intervals preceding the expected spiral track crossing (one sync mark interval in this example) and closed a number of sync mark intervals after the expected spiral track crossing (one sync mark interval in this example). In one embodiment, the ramp signal 58 is generated by integrating the high frequency signal 22 between the sync marks 24; that is, integration windows within the demodulation window are generated corresponding to the segments of high frequency signal 22 between each sync mark 24 (as determined from servo write clock).

As described above, the product servo sectors may at times overwrite a spiral track such that the resulting spiral track crossing signal is distorted, thereby inducing an error in the detected PES. Distortion in the spiral track crossing signal may also occur for other reasons, such as a defect on the media causing a partial erasure of the spiral track, or when a product servo sector is written near a spiral track but within the demodulation window. It is desirable to detect these distortions in the spiral track crossing signal so that the resulting erroneous PES may be ignored (filtered out) rather than disturb the servo algorithm. In one embodiment, the distortions are detected by correlating the detected track crossing signal with a nominal track crossing signal shifted by the PES to generate a deviation index.

Figure 7A:
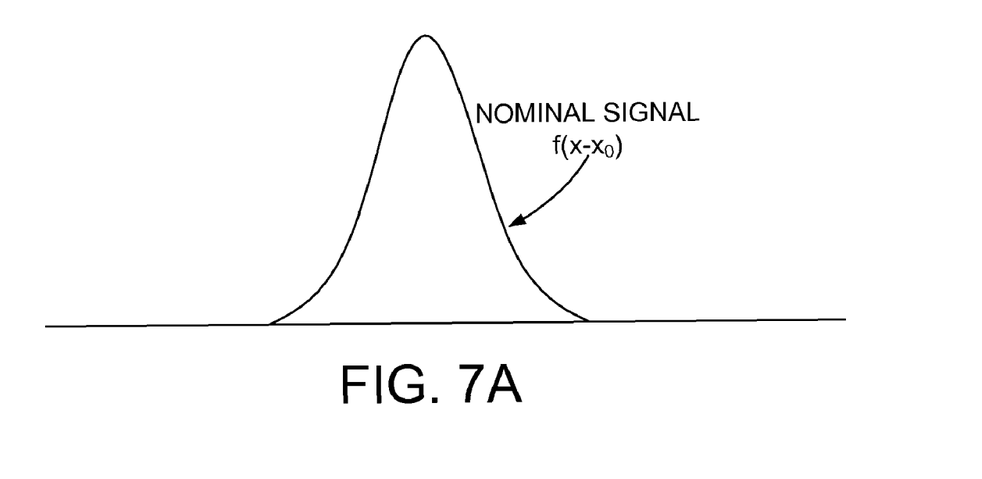
FIG. 7A shows a nominal track crossing signal according to an embodiment of the present invention.
Figure 7B:
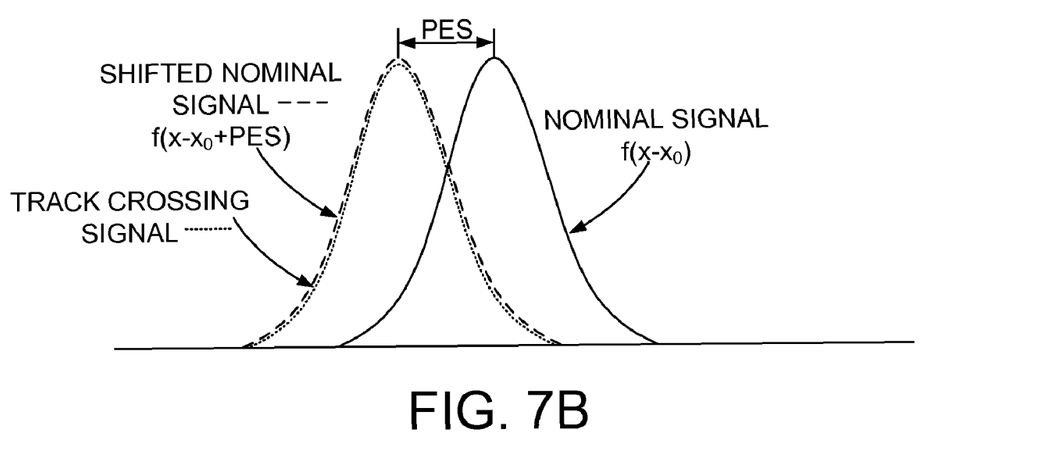
FIG. 7B shows an embodiment of the present invention wherein the PES corresponds to a time shift of the nominal track crossing signal.

FIG. 7A shows a nominal track crossing signal and a function $f(x-x_0)$ that estimates the nominal track crossing signal, where $x_0$ represents the middle of the demodulation window where PES=0. If there are no distortions in the track crossing signal, the resulting PES (e.g., generated as described above with reference to FIG. 6) will correspond to a shift in the nominal track crossing signal by the PES (from the center of the demodulation window) as shown in FIG. 7B. However, if there is a distortion in the spiral track crossing signal (due to partial erasure, overwriting by product servo sector, etc.), it will cause a corresponding distortion in the detected PES. Therefore, the distortion in the spiral track crossing signal can be detected by correlating the spiral track crossing signal with the nominal track crossing signal shifted by the detected PES.

The nominal track crossing signal of FIG. 7A may be generated using any suitable technique. In one embodiment, the head 28 is servoed over a target radial location of the disk 18 by demodulating the spiral tracks and generating a PES using the integration technique described above with reference to FIG. 6. When the head 28 is positioned directly over the target radial location (PES=0) the sampled spiral track crossing signal $g(x_n)$ shown in FIG. 8A is generated, wherein in one embodiment, each sample of the sampled spiral track crossing signal $g(x_n)$ is generated by integrating the read signal between the sync marks (sync mark integration window) as shown in FIG. 8A.

Figure 8B:
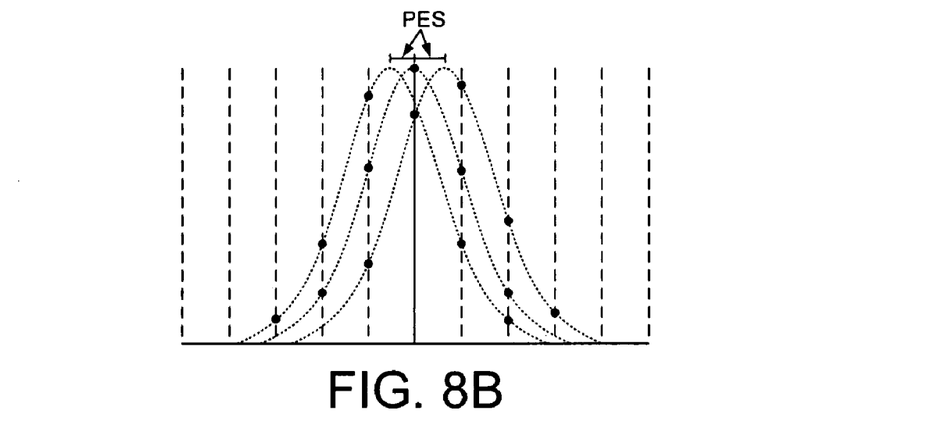
Figure 8C:
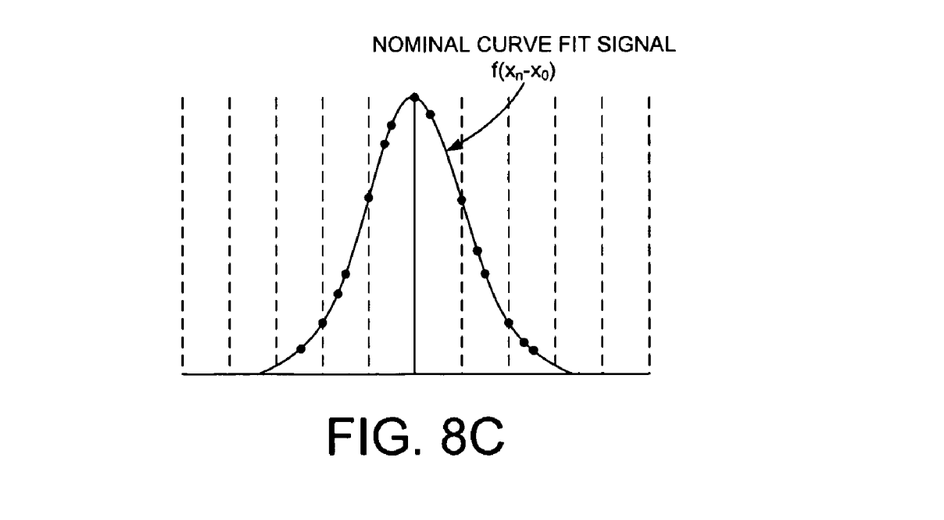

In an embodiment shown in FIG. 8B, the nominal track crossing signal is generated by reading a plurality of the spiral tracks. When a particular spiral track crossing signal has a non-zero PES, the resulting read signal samples are shifted by the PES so that the resulting read signal samples align with the PES=0 signal as shown in FIG. 8C. After reading a plurality of the spiral tracks and generating a number of sampled spiral track crossing signals as shown in FIG. 8C, the discrete-time function $f(x_n-x_0)$ that estimates the nominal track crossing signal is generated by curve fitting the function to the read signal samples.

Any suitable function $f(x_n-x_0)$ for estimating the nominal track crossing signal may be employed in the embodiments of the present invention. The function may be a simple linear function, such as a triangle function, or a more sophisticated function, such as a Gaussian function:

$$\frac{1}{\sigma\sqrt{2\pi}}e^{\frac{(x_n+PES)^2}{2\sigma^2}}$$

In the above equation, the time-shift PES is a mean and $\sigma$ is a standard deviation, where the standard deviation $\sigma$ a is estimated by curve fitting to the read signal samples as illustrated in FIG. 8C.

Figure 9A:
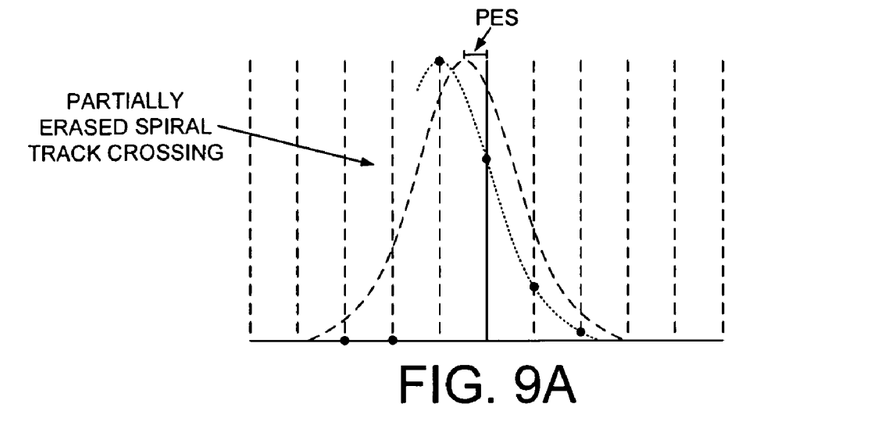
FIG. 9A shows a partially erased spiral track crossing, the resulting PES that is generated, and the corresponding nominal track crossing signal shifted by the PES, wherein the resulting correlation between the spiral track crossing signal and the nominal track crossing signal shifted by the PES will fall below a threshold due to the partial erasure.
Figure 9B:
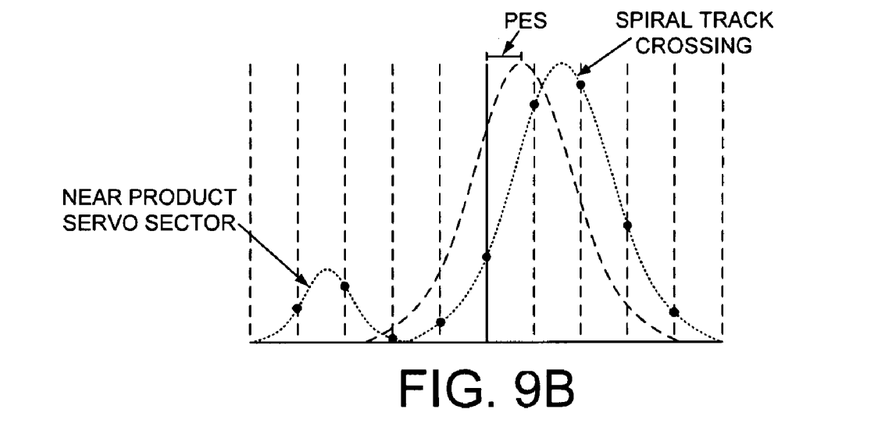
FIG. 9B shows a near product servo sector occurring within the spiral track crossing demodulation window which may be detected by the under correlation of the spiral track crossing signal with the nominal track crossing signal shifted by the resulting PES.
Figure 9C:
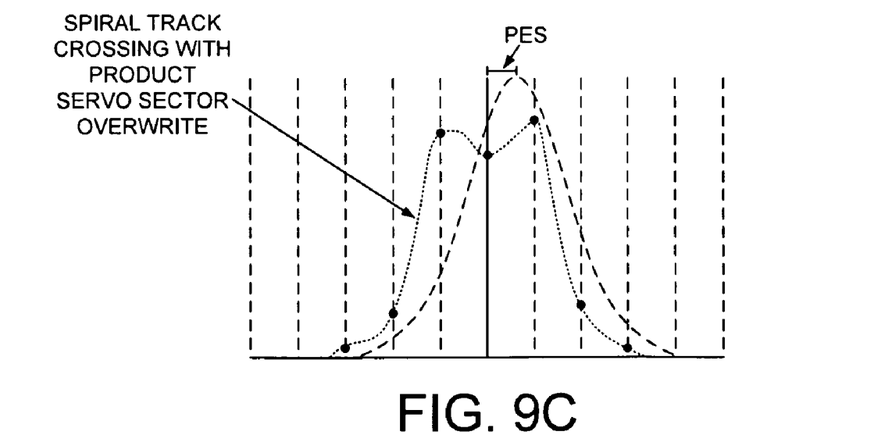
FIG. 9C shows a spiral track crossing signal distorted when a product servo sector overwrites the spiral track, which may be detected by the under correlation of the spiral track crossing signal with the nominal track crossing signal shifted by the resulting PES.

FIG. 9A illustrates an example distortion in the spiral track crossing signal (dotted line) due to a spiral track being partially erased, and the resulting error in the detected PES. When the spiral track crossing signal is correlated with the nominal track crossing signal (dashed line) shifted by the detected PES, the resulting deviation index will exceed a threshold and the distortion detected. FIG. 9B illustrates an example distortion in the spiral track crossing signal due to a product servo sector being written near the spiral track within the demodulation window. FIG. 9C illustrates an example distortion in the spiral track crossing signal due to a product servo sector overwriting the spiral track. In the example of FIG. 9C, the spiral track crossing occurs at an actual PES of zero, but the detected PES is non-zero due to the product servo sector overwrite. The resulting deviation index computed in response to the detected PES will identify the distortion in the spiral track crossing signal.

Figure 9D:
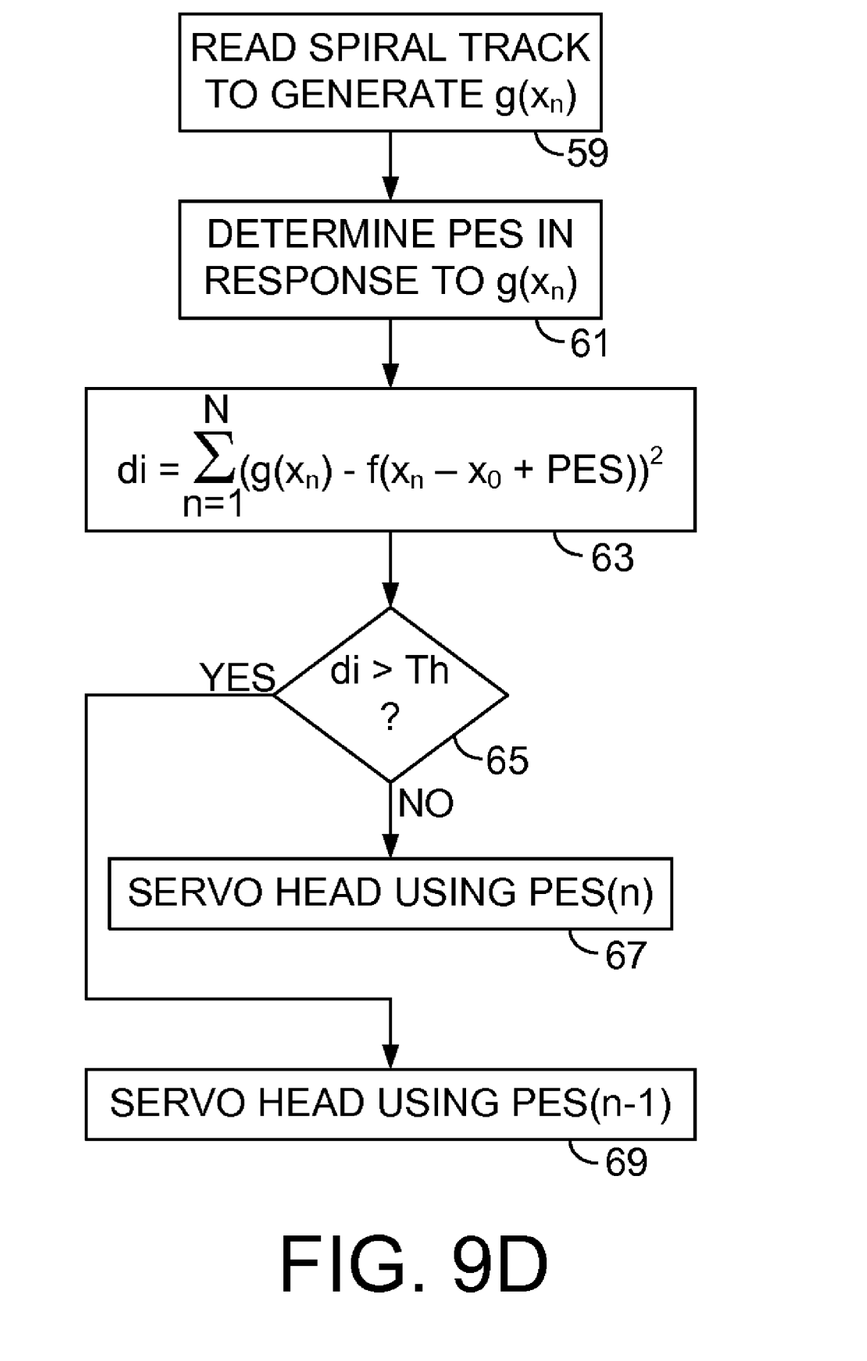
FIG. 9D is a flow diagram according to an embodiment of the present invention wherein when the deviation index computed from the correlation exceeds a threshold, the current PES is ignored and the previous PES is used to servo the head.

FIG. 9D is a flow diagram according to an embodiment of the present invention wherein one of the spiral tracks is read (step 59) in order to generate a spiral track crossing signal $g(x_n)$. A PES is determined (step 61) in response to $g(x_n)$, such as using the integration technique described above with reference to FIG. 6. A deviation index is then computed (step 63) by correlating $g(x_n)$ with a nominal track crossing signal shifted by the PES. If the deviation index is less than a threshold (step 65), then the head is servoed using the current PES(n) (step 67). If the deviation index exceeds the threshold (step 65), indicating a distortion occurred in the spiral track crossing signal, then the current PES(n) is ignored and the head is servoed using a previously generated PES(n−1) (step 69).

The nominal track crossing signal and corresponding function $f(x_n-x_0)$ may be estimated at any suitable location or locations along the radius of the disk. In one embodiment, the nominal track crossing signal and corresponding function $f(x_n-x_0)$ are estimated once, for example, near a middle diameter of the disk. In another embodiment, the nominal track crossing signal and corresponding function $f(x_n-x_0)$ may be estimated for a number of zones across the disk radius, and in yet another embodiment, the nominal track crossing signal and corresponding function $f(x_n-x_0)$ may be estimated for every servo track.

Figure 9E:
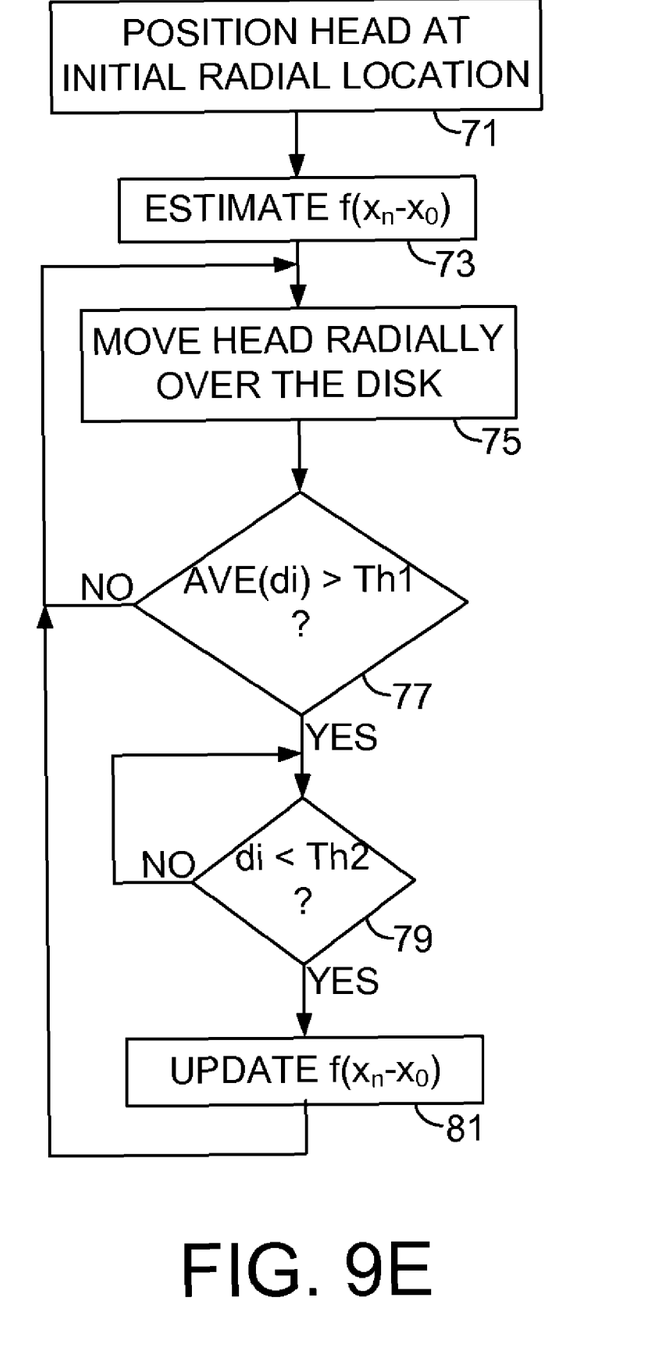
FIG. 9E is a flow diagram an embodiment of the present invention wherein the nominal track crossing signal is initialized at an initial, clean radial location on the disk, and then updated as the head moves radially over the disk.

FIG. 9E is a flow diagram according to an embodiment of the present invention, wherein the head is positioned (step 71) at an initial radial location (e.g., near the ID) where a number of "clean" spiral track crossings are known to exist (e.g., an area where product servo sectors have not yet been written). The nominal track crossing signal $f(x_n-x_0)$ is then estimated at this initial radial location (step 73). Thereafter, the nominal track crossing signal $f(x_n-x_0)$ may be updated as the head moves radially over the disk (step 75). For example, when the average deviation index (e.g., running average) is greater than a first threshold Th1 (step 77), it may indicate the nominal track crossing signal is changing relative to its initial estimation. Therefore, in one embodiment the nominal track crossing signal $f(x_n-x_0)$ may be updated (step 81) using a spiral track crossing signal that generates a deviation index that is less than a second threshold Th2 (step 79). Any suitable thresholds Th1 and Th2 may be employed, and in one embodiment Th1 equals Th2.

In the embodiment described above with reference to FIG. 5 the spiral tracks are demodulated in order to write product servo sectors $56_0$-$56_N$ to the disk. During normal operation of the disk drive, the control circuitry 34 demodulates the product servo sectors $56_0$-$56_N$ to generate the PES used to servo the head during write and read operations. In an alternative embodiment, the control circuitry 34 demodulates the spiral tracks in order to generate the PES for servoing the head during write and read operations. For example, product servo sectors $56_0$-$56_N$ may be written to the disk by servoing off of the spiral tracks as described above with reference to FIG. 5 except that the servo bursts 14 may be omitted from the product servo sectors. When the control circuitry 34 demodulates the product servo sectors $56_0$-$56_N$ during normal operation, the residual spiral tracks are also demodulated in order to generate the fine position information similar to using servo bursts 14.

Figure 10:
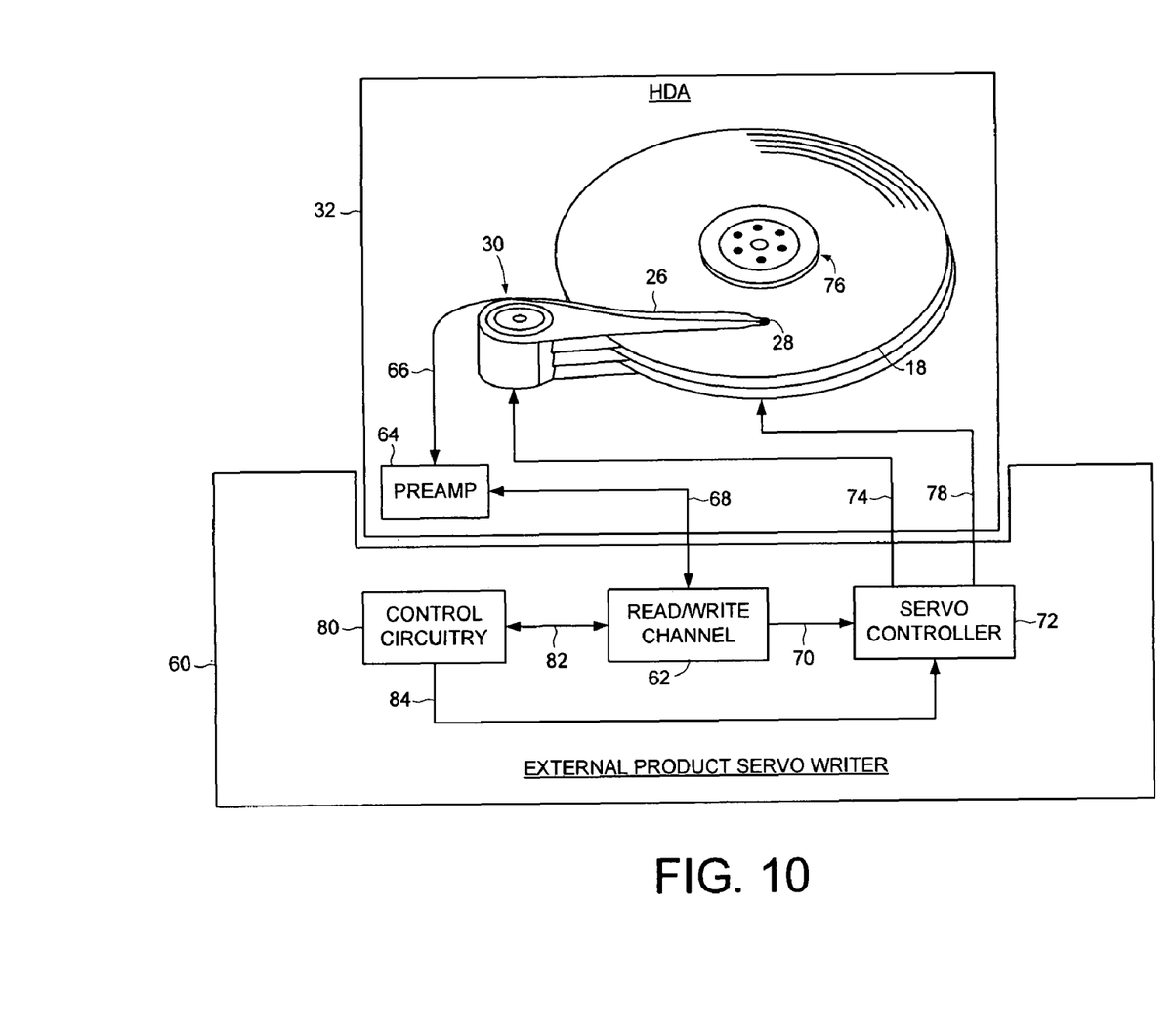
FIG. 10 shows an embodiment of the present invention wherein an external product servo writer is used to process the spiral tracks in order to write product servo sectors to the disk.
Figure 11:
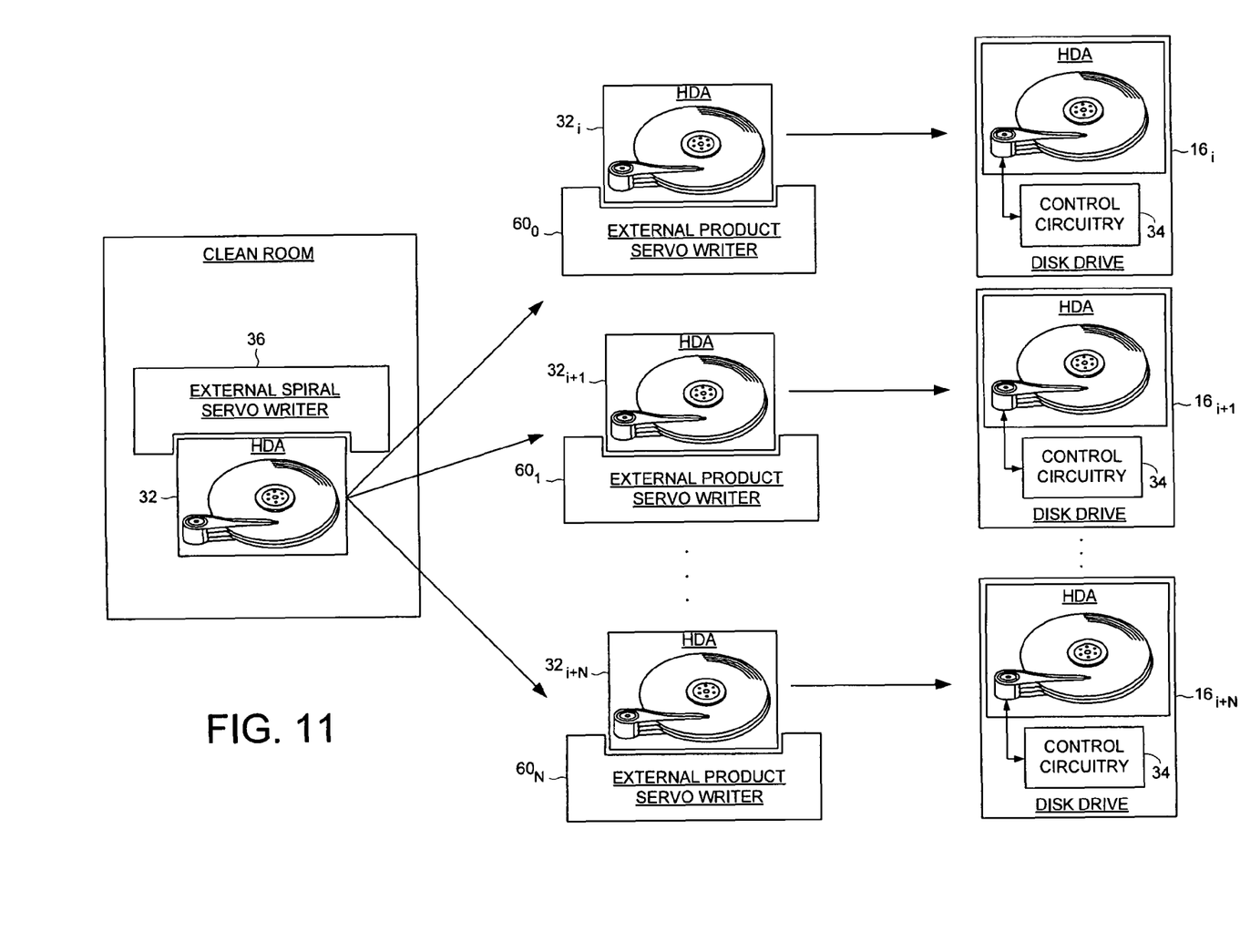
FIG. 11 shows an embodiment of the present invention wherein an external spiral servo writer is used to write the spiral tracks, and a plurality of external product servo writers write the product servo sectors for the HDAs output by the external spiral servo writer.

FIG. 10 shows an embodiment of the present invention wherein after writing the spiral tracks $20_0$-$20_N$ to the disk 18 (FIGS. 2A-2B), the HDA 32 is inserted into an external product servo writer 60 comprising suitable circuitry for reading and processing the spiral tracks $20_0$-$20_N$ in order to write the product servo sectors $56_0$-$56_N$ to the disk 18. The external product servo writer 60 comprises a read/write channel 62 for interfacing with a preamp 64 in the HDA 32. The preamp 64 amplifies a read signal emanating from the head 28 over line 66 to generate an amplified read signal applied to the read/write channel 62 over line 68. The read/write channel 62 comprises circuitry for generating servo burst signals 70 applied to a servo controller 72. The servo controller 72 processes the servo burst signals 70 to generate the PES. The PES is processed to generate a VCM control signal applied to the VCM 30 over line 74 in order to maintain the head 28 along a circular path while writing the product servo sectors $56_0$-$56_N$. The servo controller 72 also generates a spindle motor control signal applied to a spindle motor 76 over line 78 to maintain the disk 18 at a desired angular velocity. Control circuitry 80 processes information received from the read/write channel 32 over line 82 associated with the spiral tracks $20_0$-$20_N$ (e.g., timing information) and provides the product servo sector data to the read/write channel 62 at the appropriate time. The product servo sector data is provided to the preamp 64 which modulates a current in the head 28 in order to write the product servo sectors $56_0$-$56_N$ to the disk 18. The control circuitry 80 also transmits control information over line 84 to the servo controller 72 such as the target servo track to be written. After writing the product servo sectors $56_0$-$56_N$ to the disk 18, the HDA 32 is removed from the external product servo writer 60 and a printed circuit board assembly (PCBA) comprising the control circuitry 34 (FIG. 2A) is mounted to the HDA 32.

Figure 12:
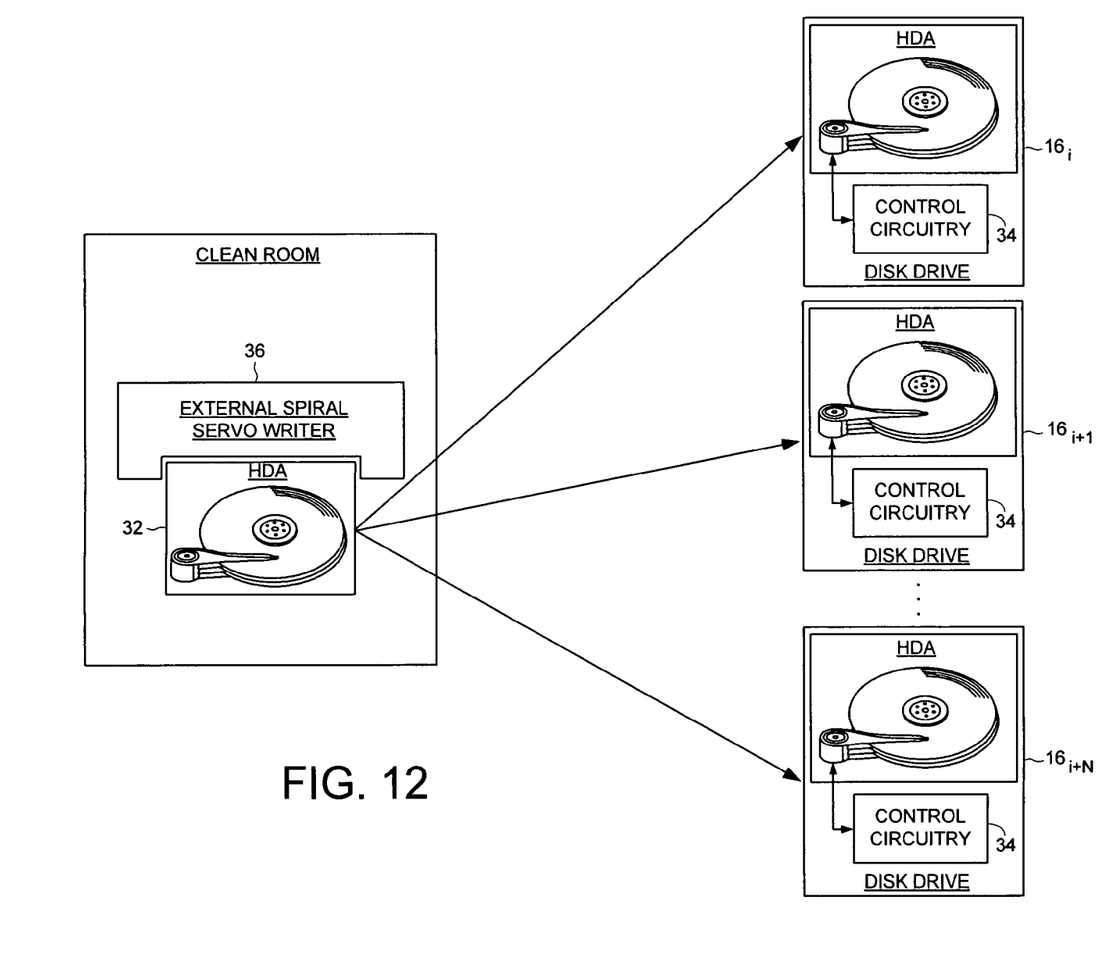
FIG. 12 shows an embodiment of the present invention wherein an external spiral servo writer is used to write the spiral tracks, and the control circuitry within each product disk drive is used to write the product servo sectors.

In one embodiment, the external product servo writer 60 of FIG. 10 interfaces with the HDA 32 over the same connections as the control circuitry 34 to minimize the modifications needed to facilitate the external product servo writer 60. The external product servo writer 60 is less expensive than a conventional servo writer because it does not require a clean room or sophisticated head positioning mechanics. In an embodiment shown in FIG. 11, a plurality of external product servo writers $60_0$-$60_N$ process the HDAs $32_i$-$32_{i+N}$ output by an external spiral servo writer 36 in order to write the product servo sectors less expensively and more efficiently than a conventional servo writer. In an alternative embodiment shown in FIG. 12, an external spiral servo writer 36 is used to write the spiral tracks, and the control circuitry 34 within each product disk drive $16_i$-$16_{i+N}$ is used to write the product servo sectors.

What is claimed is:

1. A disk drive comprising:
   a disk comprising a plurality of spiral tracks, wherein each spiral track comprises a high frequency signal interrupted by a sync mark at a sync mark interval;
   a head actuated over the disk; and
   control circuitry operable to:
   use the head to read a spiral track to generate a spiral track crossing signal $g(x_n)$, where $x_n$ is a time in a demodulation window;
   determine a position error signal (PES) in response to $g(x_n)$;
   compute a deviation index by correlating $g(x_n)$ with a nominal track crossing signal shifted by the PES; and
   when the deviation index is less than a threshold, use the PES to servo the head over the disk.

2. The disk drive as recited in claim 1, wherein the control circuitry is operable to compute the deviation index according to:

$$di = \sum_{n=1}^{N} (g(x_n) - f(x_n - x_0 + PES))^2$$

where di is the deviation index and $f(x_n-x_0+PES)$ represents the nominal track crossing signal shifted by the PES.

3. The disk drive as recited in claim 1, where the control circuitry is further operable to utilize a previously generated PES to servo the head when the deviation index exceeds the threshold.

4. The disk drive as recited in claim 1, wherein the control circuitry is further operable to write product servo sectors to the disk while servoing the head in response to the PES.

5. The disk drive as recited in claim 1, wherein the control circuitry is further operable to position the head at an initial radial location in order to estimate an initial nominal track crossing signal.

6. The disk drive as recited in claim 1, wherein the control circuitry is further operable to update the nominal track crossing signal as the head moves radially over the disk.

7. The disk drive as recited in claim 6, wherein the control circuitry is further operable to update the nominal track crossing signal when the average deviation index is greater than a first threshold.

8. The disk drive as recited in claim 7, wherein the control circuitry is further operable to update the nominal track crossing signal when the deviation index is less than a second threshold.

9. A method of operating a disk drive, the disk drive comprising a disk and a head actuated over the disk, wherein the disk comprises a plurality of spiral tracks each comprising a high frequency signal interrupted by a sync mark at a sync mark interval, the method comprising:
   using the head to read a spiral track to generate a spiral track crossing signal $g(x_n)$, where $x_n$ is a time in a demodulation window;
   determining a position error signal (PES) in response to $g(x_n)$;
   computing a deviation index by correlating $g(x_n)$ with a nominal track crossing signal shifted by the PES; and
   when the deviation index is less than a threshold, using the PES to servo the head over the disk.

10. The method as recited in claim 9, wherein the deviation index is computed according to:

$$di = \sum_{n=1}^{N} (g(x_n) - f(x_n - x_0 + PES))^2$$

where di is the deviation index and $f(x_n-x_0+PES)$ represents the nominal track crossing signal shifted by the PES.

11. The method as recited in claim 9, further comprising utilizing a previously generated PES to servo the head when the deviation index exceeds the threshold.

12. The method as recited in claim 9, further comprising writing product servo sectors to the disk while servoing the head in response to the PES.

13. The method as recited in claim 9, further comprising positioning the head at an initial radial location in order to estimate an initial nominal track crossing signal.

14. The method as recited in claim 9, further comprising updating the nominal track crossing signal as the head moves radially over the disk.

15. The method as recited in claim 14, further comprising updating the nominal track crossing signal when the average deviation index is greater than a first threshold.

16. The method as recited in claim 15, further comprising updating the nominal track crossing signal when the deviation index is less than a second threshold.

* * * * *